United States Patent [19]

Friedman

[11] Patent Number: 4,995,345
[45] Date of Patent: Feb. 26, 1991

[54] DE-LOUSING BAG FOR PETS

[76] Inventor: Hilda G. Friedman, 637 S. DePeyster St., Kent, Ohio 44240

[21] Appl. No.: 448,350

[22] Filed: Dec. 11, 1989

[51] Int. Cl.⁵ ............................................. A01K 13/00
[52] U.S. Cl. ...................................... 119/160; 119/159
[58] Field of Search ........................ 119/1, 83, 96, 156, 119/159, 160

[56] References Cited

U.S. PATENT DOCUMENTS

| | | | |
|---|---|---|---|
| 3,108,568 | 10/1963 | Whitney et al. | 119/160 |
| 3,150,641 | 9/1964 | Kesh | 119/160 |
| 3,547,079 | 12/1970 | Bassett | 119/96 |
| 3,596,636 | 8/1971 | Stobangh | 119/160 |
| 4,144,845 | 3/1979 | Sueider | 119/160 |
| 4,184,454 | 1/1980 | Nagao | 119/160 |
| 4,782,792 | 11/1988 | Anthony et al. | 119/159 |

FOREIGN PATENT DOCUMENTS 1569519  6/1980  United Kingdom ................ 119/160

Primary Examiner—John Weiss
Attorney, Agent, or Firm—Gustalo Nunez

[57] ABSTRACT

This invention relates to a waterproof, airtight and dustproof bag which is used for the extermination of fleas from an animal such as a dog. The bag, which is open on one end, is shaped so that it can easily be used to encapsulate a pet such as a dog. At the open end thereof are closing means such as Velcro ®. The dog is placed in the bag which is then partially closed, a flea insecticide or flea spray is inserted into the bag cavity at which time the bag is closed to the extent that only the dog's head is protruding out of the bag which therefore prevents the fleas from escaping, thus insuring a total kill of the fleas, all within the approximate time of five minutes.

2 Claims, 1 Drawing Sheet

4,995,345

DE-LOUSING BAG FOR PETS

BACKGROUND OF THE INVENTION

1. Field of the Invention

The present invention relates to an encapsulating device to be used by pet owners and veterinarians for delousing pets such as dogs. The invention can be used indoors or outdoors, and is not limited by any kind of construction.

2. Description of the Prior Art

It is well known that animals such as dogs and cats harbor pests such as fleas and, for the well-being of the pet, it is important to rid the pets of these pests. U.S. Pat. No. 3,150,641 is directed to a cover which is placed around a dog. It is rather complicated in construction in that the cover has provisions for individually encapsulating the paws, tail and body. This would tend to make the cover more difficult to work with and expensive to manufacture.

SUMMARY OF THE INVENTION

Fleas are probably the most common and prevalent parasite which are indigenous to pets such as dogs, cats, rabbits and the like. The fleas live off of the blood of the host animal carrying them and cause the animal great discomfort and illness. An animal that eats a flea from its paw or wherever can result in having tape-worms, therefore adding more problems. The animal may scratch itself to the point where the skin is broken, which can lead to infection. Flea infestation is an abnormal situation and can cause serious disease not only to the animal but to those humans who handle the animal.

Puppies are especially vulnerable to flea infestation which is serious in view of their physical size, i.e. significant loss of blood in a puppy can result in death.

The present invention is directed to a convenient device which can be used to delouse an animal and to use the bag, one need not be a trained technician or a veterinarian; in fact, a child can use the present invention.

The delousing device according to the present invention is a bag somewhat rhombic in shape at one end thereof and generally square at the other end thereof. The entire bag is closed excepting the rhombic end which is equipped with Velcro ® closing means and is made waterproof, airtight and dustproof, to not only kill the fleas but also to prevent the release of insecticide and/or dust from the carpet and furniture.

In use, the animal is placed into the bag, the bag is closed about the animal with the animal's head positioned outside of the bag. The bag is opened to the extent that an insecticide for killing fleas can be introduced into the bag. Upon completion of this act, the bag is closed all the way to the animal's neck. This prevents the fleas from escaping, thus insuring their demise.

Primary objectives of the invention are to provide: (1) a bag of simple construction which can be used to completely cover an animal such as a dog; (2) a simple bag construction which is used to retain an animal while being deloused; and, (3) a bag with which an animal can be encapsulated, into which a pest insecticide can be readily introduced, and from which the pests cannot escape.

BRIEF DESCRIPTION OF THE DRAWINGS

The foregoing and other advantages of the invention will become more apparent from the following detailed description which proceeds with reference to the following detailed drawings wherein.

DETAILED DESCRIPTION OF THE PREFERRED EMBODIMENT

"Horizontal" and "vertical" as used herein with reference to the elements comprising the delousing bag refer to the normal disposition of such elements when the animal is placed in the bag with the animal's head and body erect and the animal's eyes directed horizontally.

Figure 1:
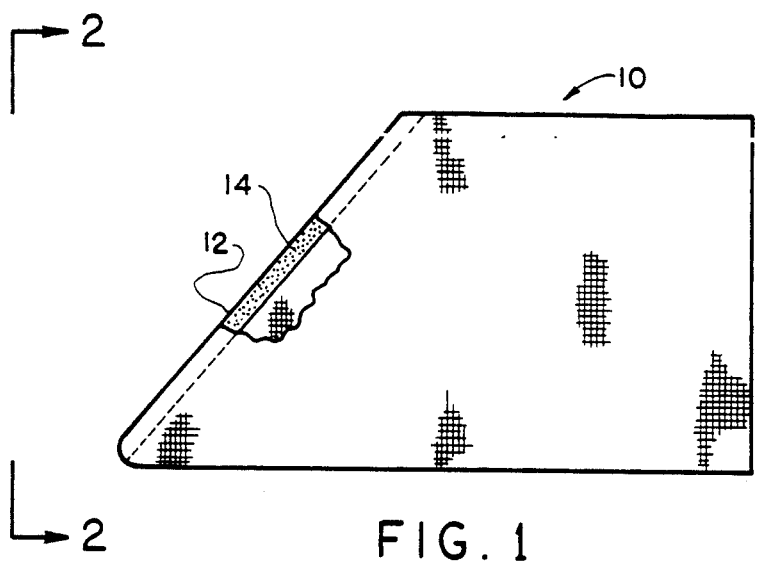
FIG. 1 is a side view of the delousing bag in accordance with the invention.
Figure 2:
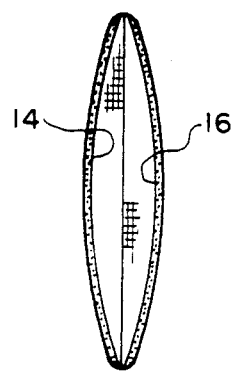
FIG. 2 is a front view of the delousing bag taken along lines 2—2.

With reference to the drawings, FIG. 1 discloses a delousing bag 10 terminating at the forward end 12 at some angle with respect to the vertical, the angle being determined by the use desired and by the type of animal the delousing bag is to be used with. Bag 10 terminates at a rearward end 13, and further includes a top end 11 and bottom end 15. It can be seen that the forward end 12 and the rearward end 13 define planes which are not parallel with each other, i.e. the forward end 12 is angularly disposed with respect to the rearward end 13. Looking at FIG. 2, which illustrates the front view of the delousing bag 10, it can be seen that closure means 14 and 16 are provided, said closure means in this instance being Velcro ®, although other means such as a zipper or snap buttons or conventional buttons could be used. The closure means 14 and 16 in this instance are located at the bottom forward portion of the bag 10 and proceed in an upwardly direction to the top forward end of the bag 10.

Figure 3:
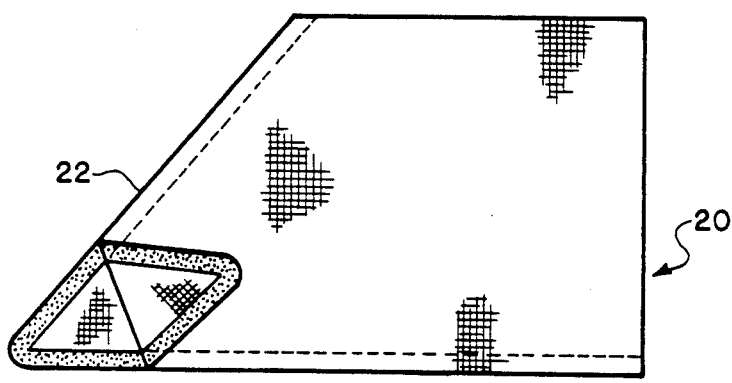
FIG. 3 is a side view of a second embodiment of the invention for persons who prefer a delousing bag which can be opened over a greater extent of the bag.

FIG. 3 illustrates a second embodiment of the invention which is delousing bag 20 terminating at the forward end 22 at some angle with respect to the vertical, again with the angle being determined by the use to which the bag will be placed and by the type of animal to be treated. Bag 20 terminates at the rearward end 26 and further includes a top end 24 and a bottom end 28. As with bag 10, the forward end 22 and rearward end 26 define planes which are not parallel with each other. Bag 20 further includes closure means 22 starting at the rearward bottom horizontal portion 28 and proceeding in a horizontal direction towards the forward end 22 and then in an upwardly direction on the forward end 22, terminating at the top end 24. It can be seen that the Velcro ® closing means covers a greater portion of the bag and which, therefore, permits a greater portion of the delousing bag to be opened and which also facilitates placing the bag over the animal.

Figure 4:
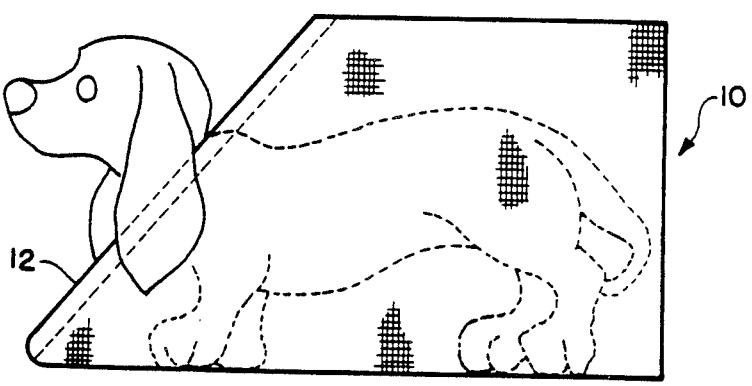
FIG. 4 is a view of the delousing bag illustrating the use thereof with a dog in accordance with the present invention.

FIG. 4 illustrates the use of the delousing bag 10 and/or 20 in use, having as the subject, a dog. The entire delousing bag is completely closed excepting that portion where the dog's neck protrudes. The result of the type of construction disclosed herein in accordance with the invention is that when the delousing bag 10 is placed on the dog and closed up to the dog'neck, the dog will have sufficient room within the delousing bag 10 or 20 to be comfortable and have some freedom of movement.

At the time the pest insecticide is to be applied, the person need only to open the bag by pulling the Velcro ® closing means apart at whatever portion of the delousing bag 10 the user desires, and thus introduce the pest insecticide into the delousing bag 10. The delousing bag 10 is then closed, thus keeping the insecticide within the bag. This greatly enhances the exterminating powers of the insecticide and, coupled with the fact that the fleas cannot escape the delousing bag 10, results in the complete extermination of the fleas, which take approximately five minutes.

The delousing bag construction may be of a material such as nylon or a combination nylon with any other suitable material which is waterproof, airtight and dustproof for effectiveness.

It is understood that the form of the invention herewith shown and described is to be taken as a preferred example of the same and that obvious changes relative to the material, size and shape of the delousing bag may be resorted to to without departing from the spirit of the invention disclosed herein. The preferred embodiment is therefore considered to be illustrative and not restrictive, the scope of the invention being indicated by the appended claims.

What I claim is:

1. An animal delousing container comprising:
   a tube section, having an angularly disposed forward end, rearward end, top side and bottom side and closed on all sides and ends, except for a closeable opening provided on the forward end and bottom side, said closeable opening operating as the means for the introduction of an animal into said tube section, said animal being introduced into said tube section such that the animal's head is adjacent to said top side thereby providing the animal more room at the bottom end thereof for movement, said tube section separating into a hollow body upon the introduction of said animal into said tube section, said closure opening means further operating as the means for the introduction of pest insecticides into said hollow body, said closeable opening operating to close said hollow body to the extent that the animal's body, excepting the head portion, is completely encapsulated thereby containing said pest insecticide within the proximity of the animal's body for greater effectiveness in eradicating said pests.

2. An animal delousing container comprising:
   a forward end and a rearward end and flat tube section including a top side and bottom side, said top side and rearward end being permanently closed and said bottom side and said forward end provided with closure opening means, said forward end being angularly disposed with respect to said rearward end, said closeable opening operating as the means for the introduction of an animal into said tube section, said tube section expanding into a tubular hollow body upon the introduction of said animal, said closure opening means further operating as the means for the introduction of exterminating insecticides into said tubular hollow body, said closeable opening operating to close said tubular hollow body to the extent that the animal's body, excepting the head portion, is completely encapsulated thereby restricting said exterminating insecticide to the proximity of the animal's body.

* * * * *